(No Model.)
C. F. CARPENTER,
NON MAGNETIC WATCH BALANCE.
No. 489,790. Patented Jan. 10, 1893.
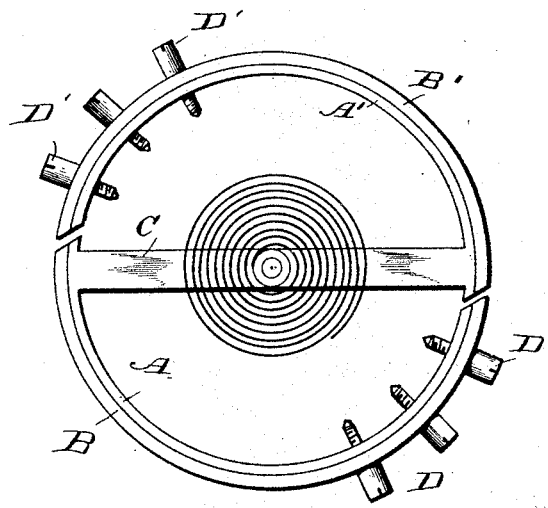
Witnesses
Jesse Heller
Philip C. Masi
Inventor
Chas F. Carpenter,
by E. W. Anderson,
his Attorney

UNITED STATES PATENT OFFICE.

CHARLES F. CARPENTER, OF LOUISVILLE, KENTUCKY.

NON-MAGNETIC WATCH-BALANCE.

SPECIFICATION forming part of Letters Patent No. 489,790, dated January 10, 1893.

Application filed February 29, 1892. Serial No. 423,245. (No model.)

*To all whom it may concern:*

Be it known that I, CHARLES F. CARPENTER, a citizen of the United States, and a resident of Louisville, in the county of Jefferson and State of Kentucky, have invented certain new and useful Improvements in Watches and other Time-Keeping Instruments; and I do declare the following to be a full, clear, and exact description of the invention, such as will enable others skilled in the art to which it appertains to make and use the same, reference being had to the accompanying drawing, and to letters of reference marked thereon, which form a part of this specification.

The figure of the drawing is a representation of the invention and is a plan view.

The invention has relation to certain new and useful improvements in compensating balances, and balance springs, for watches, chronometers and other like instruments; and it consists in the novel construction and combination of parts as hereinafter specified.

The balance springs and balances in watches, chronometers &c. are commonly made of steel, but this metal is now objectionable for that purpose because steel is acted upon by electricity and magnetism, and consequently the time keeping qualities of watches and chronometers are seriously injured thereby.

The ordinary compensating balance in a watch, chronometer &c. has two rims in each segment, the inner rim A, A' and arm C of steel, the outer rim B, B' of brass, the unequal expansion of which two metals in different degrees of temperature is just enough to move the screws or weights D, D, D, D', D', D', the proper distance toward and from the center of the balance to compensate for the changes produced in a steel balance spring by the same variations of temperature; but a balance and spring so constructed are acted upon by electricity and magnetism and consequently keep very irregular time.

A watch, chronometer &c. with an ordinary steel balance spring, and a plain or non-compensating balance will vary nearly seven (7) minutes in twenty-four hours between 30° and 90° Fahrenheit. When a proper relation of the balance and balance spring is established by compensation, the variation caused by different degrees of temperature is hardly appreciable. The balance and balance spring mutually compensate for each other in correct time keeping. To render a watch, chronometer &c. free from magnetic influences it must have a non-magnetic balance and a non-magnetic balance spring.

I construct my non-magnetic balance in the following manner. The inner rim A, A' and arm C are constructed of silicon bronze, the outer rim B, B' is made of cadmium (fifty to sixty parts) and silver (forty to fifty parts). The balance spring E, is constructed preferably of iridio-platinum, which is not only non-magnetic, but is especially adapted by virtue of its other properties (as will be set forth in a future application) for the purpose. A spring constructed of this material is also found to be peculiarly effective with the balance above described.

Having described this invention, what I claim as new and desire to secure by Letters Patent is:

1. In an instrument for keeping time, a non-magnetic compensating balance having its inner rim and arm of silicon bronze, and its outer rim of cadmium alloyed with silver, substantially as specified.

2. A watch or like instrument, having a non-magnetic balance, and a non-magnetic balance spring, substantially as specified.

3. In an instrument for keeping time, the combination with a bi-metallic compensating balance, having one of its rims constructed from silicon bronze, and the other rim from cadmium alloyed with silver, of a balance spring of non-magnetic material, substantially as specified.

In testimony whereof I affix my signature in presence of two witnesses.

CHARLES F. CARPENTER.

Witnesses:
HARRY STUCKY,
JOHN B. ENRIGHT.